United States Patent
Reitz

(10) Patent No.: US 8,484,462 B2
(45) Date of Patent: Jul. 9, 2013

(54) SYSTEM AND METHOD FOR ESTABLISHING A SELF-REALIZING EXPANDABLE COMMUNICATIONS NETWORK

(75) Inventor: Elliott Reitz, Liverpool, NY (US)

(73) Assignee: Lockheed Martin Corporation, Bethesda, MD (US)

(*) Notice: Subject to any disclaimer, the term of this patent is extended or adjusted under 35 U.S.C. 154(b) by 1279 days.

(21) Appl. No.: 12/267,416

(22) Filed: Nov. 7, 2008

(65) Prior Publication Data
US 2010/0333182 A1    Dec. 30, 2010

(51) Int. Cl.
*H04L 29/06* (2006.01)

(52) U.S. Cl.
USPC ........... 713/160; 713/150; 713/168; 713/175; 713/176; 713/182; 709/236; 709/245; 370/252; 726/2; 726/7

(58) Field of Classification Search
USPC ................. 709/245, 236; 713/175–176, 189, 713/150, 168, 182; 370/252, 401; 726/2, 726/7
See application file for complete search history.

(56) References Cited

U.S. PATENT DOCUMENTS

| | | | |
|---|---|---|---|
| 5,035,481 A | 7/1991 | Mollenauer | |
| 5,365,362 A | 11/1994 | Gnauck et al. | |
| 5,516,317 A | 5/1996 | Moody | |
| 5,532,868 A | 7/1996 | Gnauck et al. | |
| 5,559,920 A | 9/1996 | Chraplyvy et al. | |
| 6,005,997 A | 12/1999 | Robinson et al. | |
| 6,122,499 A * | 9/2000 | Magnusson | 455/405 |
| 6,668,166 B1 * | 12/2003 | Kanabar | 455/411 |
| 7,254,712 B2 * | 8/2007 | Godfrey et al. | 713/176 |
| 7,293,107 B1 * | 11/2007 | Hanson et al. | 709/245 |
| 7,343,173 B2 * | 3/2008 | Leedom, Jr. | 455/552.1 |
| 8,023,425 B2 * | 9/2011 | Raleigh | 370/252 |
| 8,151,323 B2 * | 4/2012 | Harris et al. | 726/4 |
| 2001/0056544 A1 * | 12/2001 | Walker | 713/200 |
| 2002/0136226 A1 * | 9/2002 | Christoffel et al. | 370/401 |
| 2006/0069926 A1 * | 3/2006 | Ginter et al. | 713/194 |
| 2006/0246911 A1 * | 11/2006 | Petermann | 455/444 |
| 2007/0022469 A1 * | 1/2007 | Cooper et al. | 726/3 |
| 2007/0043940 A1 * | 2/2007 | Gustave et al. | 713/150 |
| 2010/0192212 A1 * | 7/2010 | Raleigh | 726/7 |
| 2011/0010556 A1 * | 1/2011 | Little et al. | 713/176 |
| 2011/0072270 A1 * | 3/2011 | Little et al. | 713/175 |
| 2011/0131419 A1 * | 6/2011 | Dowds et al. | 713/189 |
| 2011/0145602 A1 * | 6/2011 | Ginter et al. | 713/193 |
| 2012/0060026 A1 * | 3/2012 | Little et al. | 713/156 |

* cited by examiner

*Primary Examiner* — Thu Ha Nguyen
(74) *Attorney, Agent, or Firm* — Howard IP Law Group, PC

(57) ABSTRACT

This invention relates to a system and method for providing secure reliable expansion of a mobile network. The system includes one or more portable communications devices (PCDs) which incorporate routing, authentication and encryption capabilities and are adapted to provide a connection between a peripheral device and a base-station either directly or indirectly via other similarly configured PCDs. The PCDs also incorporate tamper-proofing features to provide added security.

21 Claims, 7 Drawing Sheets

SYSTEM AND METHOD FOR ESTABLISHING A SELF-REALIZING EXPANDABLE COMMUNICATIONS NETWORK

FIELD OF INVENTION

The present invention relates to network communication technology, and particularly to the deployment of expanding secure networks.

BACKGROUND

Setup and expansion of mobile communications networks in a secure and reliable manner is problematic for many communications systems, particularly for systems that require rapid deployment and/or reconfiguration. Situations often arise in modern communication systems such as military land-based communication networks, naval communication networks, and even commercial networks, where the size of the network is unconstrained. However, current communications systems do not allow for dynamic expansion of a communication network in a reliable and adequately secure manner. Additionally, network infrastructure must be carefully monitored due to the potential for equipment to be compromised or damaged. Improvements to existing communications systems to enable secure and reliable expansion are desired.

SUMMARY OF THE INVENTION

In accordance with an exemplary embodiment of the invention, a portable communications device (PCD) is contemplated which incorporates routing, authentication and encryption capabilities and is adapted to provide a connection between one or more peripheral devices and a base-station(s), either directly or indirectly via other similarly configured PCDs. The PCD of the exemplary embodiment further comprises a controller for managing communication with the peripheral devices, the base station and other PCDs. In another exemplary aspect of the invention the PCD also incorporates tamper-proofing features to provide added security.

A system for establishing a self-realizing expandable communications network comprises: a portable network communications device (PCD) including a router module for routing data communications, an authentication module for authenticating data communications received at the PCD, an encryption module for encrypting data communications output from the PCD or decrypting data communication input to the PCD, and a controller for controllably switching data communications paths or destinations of the data communications according to a control signal, wherein the PCD is operable for connecting to a computer device and transferring communications data to/from a remote base station from/to the computer device for establishing remote communications with the base station.

A method for establishing a self-realizing expandable communications network comprises: providing one or more portable communication devices (PCDs) and a base station; configuring the one or more PCDs and the base station using a first set of authentication parameters to allow remote authentication of the one or more PCDs by the base station; dispersing the one or more PCDs to remote destinations; activating the one or more PCDs; and authenticating the one or more PCDs from the base station using the first set of authentication parameters.

DETAILED DESCRIPTION

Reference will now be made in detail to the present exemplary embodiments of the invention, examples of which are illustrated in the accompanying drawings.

Figure 1:
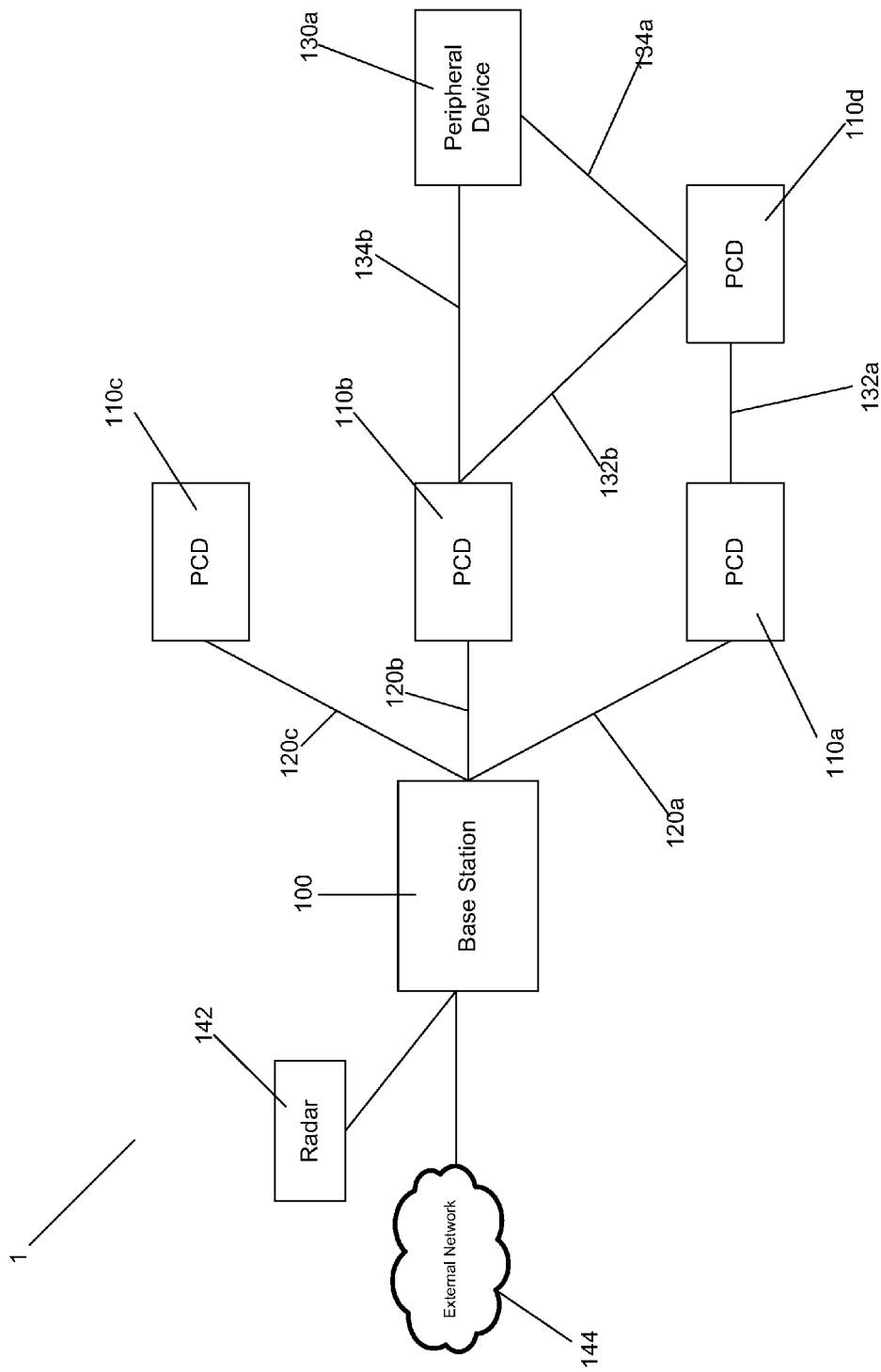
FIG. 1 is a block diagram illustrating a networked system configured according to an exemplary embodiment of the invention.

Referring to FIG. 1, a block diagram is shown illustrating a networked system configuration of an exemplary embodiment of the invention. As shown in FIG. 1, the exemplary system 1 comprises a series of Portable Communication Devices (PCDs) labeled 110*a*, 110*b*, 110*c* and 110*d*, a base station 100 and a peripheral device labeled as 130*a*. System 1 may also comprise an external network 144 and/or an external device 142 to which peripheral device 130*a* is provided secure access. Although FIG. 1 shows a single peripheral device 130*a* and four PCDs 110*a*, . . . , 110*d*, it is to be understood that any number of peripheral devices and/or PCD devices may be supported by the system. In an exemplary aspect of the present embodiment peripheral device 130*a* may be implemented as a computer device such as a laptop personal computer. External network 144 may be a network such as the Internet or a secured intranet. In an exemplary aspect of the present embodiment, external device 142 is a radar array, however, it is to be understood that the external device 142 may be any communication component that requires remote operation. Multiple external components may also be connected to the system.

The peripheral device 130*a* is connected to PCDs 110*b* and 100*d* via data links 134*a* and 134*b*. In an exemplary embodiment data links 134*a*-*b* are wireless data links but in an alternate embodiment may be implemented as physical communication lines such as copper, coaxial or fiber optic cable. Both wired and wireless links may also be provided. The PCDs 110*a*-*d* may be interconnected by data links 132*a* and 132*b*. In the preferred embodiment network data links 132*a*, 132*b* are wireless data links but may also be implemented as physical communication lines such as copper, coaxial or fiber optic cable. When implemented as physical communication lines, data links 132*a*, 132*b* may also have a metal coating adapted to distribute power to the PCD devices from an external source such as base station 100. Any or all of the PCDs 110*a*-110*d* may be interconnected by data links 132. In an exemplary embodiment the establishment of an interconnection between PCD devices is determined in part by the proximity of the devices. Providing the ability of the devices to interconnect allows the devices, in both a wireless or wired configuration, to establish multipath routing between the connected PCDs or to the base station 100. The PCDs 110*a*-110*d* are connected to base station 100 via data links 120a, 120b and 120c as shown. In an exemplary embodiment network data links 120a-120c are wireless data links but may be implemented as physical communication lines such as copper, coaxial or fiber optic cable. When implemented as physical communication lines, data links 120a-120c may also have a metal coating adapted to carry power to the PCD devices.

Figure 2:
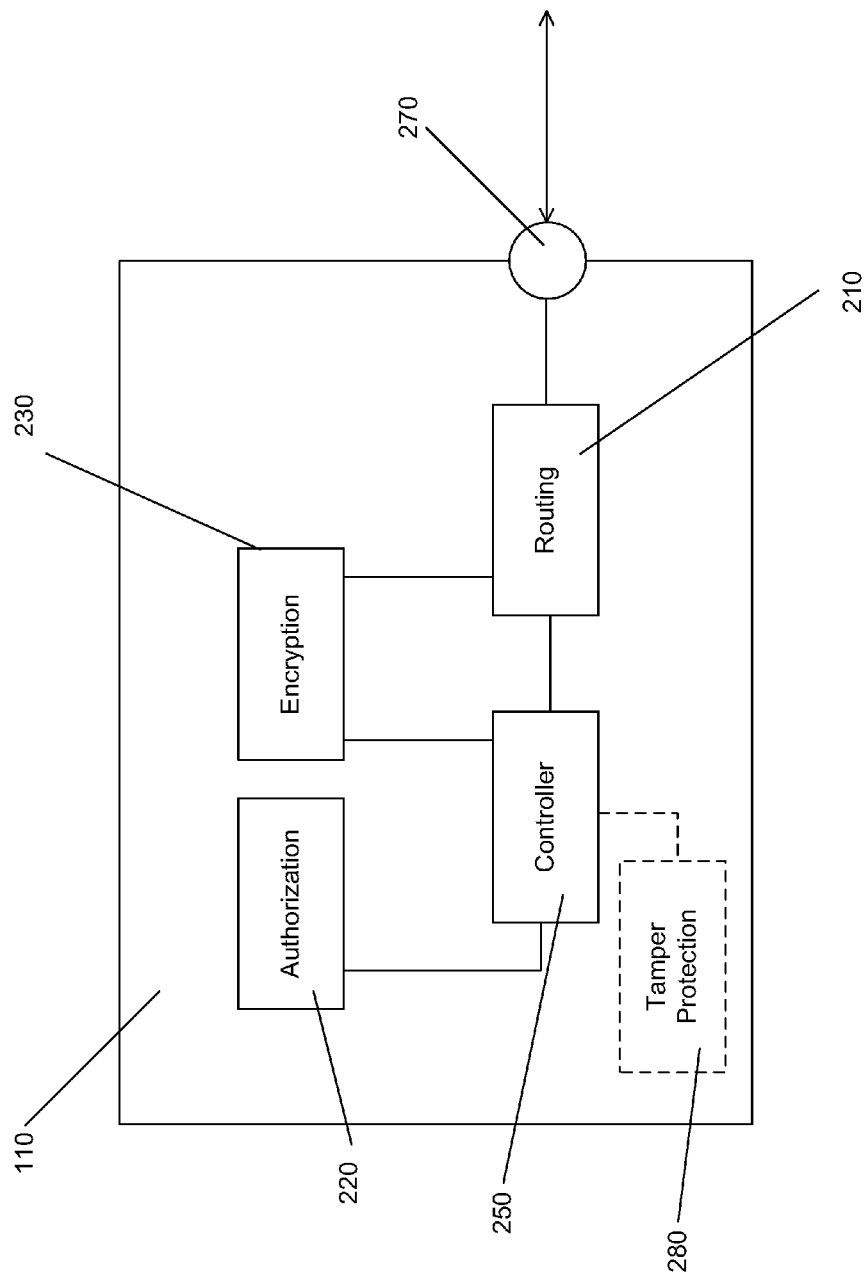
FIG. 2 is a block diagram illustrating a PCD in accordance with an exemplary embodiment of the invention.

Referring now to FIG. 2, there is shown a block diagram illustrating a PCD labeled generally as 110 in accordance with the exemplary embodiment of the invention. PCD 110 includes a routing module 210 for managing routing of data between the PCD and externally connected components such as a base station 100, peripheral devices 130a and other PCDs. The routing module 210 includes logic to support multi-path routing. Multi-path routing allows one PCD to communicate with another PCD or with the base station via alternate paths established through different devices. Referring back to FIG. 1, an example of multipath routing is illustrated by two paths that are available between PCD 110d and the base station 100. The first path utilizes data link 132a, PCD 110a and data link 120a. The second path utilizes data link 132b, PCD 110b, and data link 120b. In a scenario where PCD 110a were compromised or destroyed, routing module 210 would support the alternate path through PCD 110b thereby providing uninterrupted connectivity with the base station 100.

In another aspect of the present embodiment, the PCD 110 also includes an authorization module 220. Authorization module 220 provides logic related to network authorization and authentication. This module includes logic which allows the identity of each PCD on the network to be authenticated. In an exemplary aspect of the present embodiment, authentication parameters for each PCD are configured with the base station 100 prior to deployment. Once deployed, each PCD can be immediately authenticated with the base station 100. Protocols for implementing authentication such as public key infrastructure (PKI) are well known in the art. Authentication module 220 also provides logic for authenticating the identity of a peripheral device 130 with the PCD 110. In an exemplary aspect, authentication of a peripheral device may be carried out by providing each PCD with a password library. Pre-existing knowledge of a password may be required for a peripheral device 130 or user of a peripheral device to access the PCD.

In another aspect of the present embodiment, PCD 110 also incorporates encryption logic 230 for encrypting and decrypting data flowing between the PCD 110 and any device in communication with the PCD including the base station 100, a peripheral device 130 or another PCD 110. Encryption technologies such as but not limited to 128-bit SSL encryption may be used. The PCD authorization 220 and encryption 230 modules may be implemented as separate or interrelated functional components.

PCD 110 also includes a controller 250 for managing operation of the device. Controller 250 may be implemented as a field-programmable gate array (FPGA), an application-specific integrated circuit (ASIC), a microcontroller or a combination of a microprocessor or CPU and volatile or non-volatile memory. Modules 210, 220, and 230 may be implemented as separate components or integrated with the controller 250. These modules may be implemented in hardware or as software embodied in a computer readable medium such as but not limited to a CD, DVD, or any type of non-volatile memory such as an electrically erasable programmable read-only memory (EEPROM).

PCD 110 also includes a communication port 270 for providing access to external components. In a land-based application the communication port may include one or more wireless, fiber optic, or wired ports. In a sea-based application the communication port may include one or more fiber optic or sonic ports. By way of example only, exclusive use of wired ports supports environments where long term operation is desired and powered nodes are therefore required. Wireless ports are favored for land-based operation on a temporary basis. Fiber optic communications are of primary reference in long-distance and stealthy applications such as undersea applications.

In an exemplary aspect of the present embodiment the PCD 110 is powered by a battery. However, in an alternate embodiment the PCD may be externally powered. When externally powered the communication port 270 of the PCD 110 may be adapted to receive power via a metal-coated data link such as one of links 120a-c or 132a-b that have been adapted to carry power from a base station 100 or another external power source. The metal-coated data link may comprise a fiber-optic core surrounded by a conductive metal-coating. An insulating layer may further surround the metal layer. In a sea-based application where the metal coating carries power to a PCD the ocean may act as the ground reference.

In an alternate aspect of the exemplary embodiment the PCD 110 additionally includes a tamper protection module 280 that provides logic for detecting and appropriately responding to any of a number of potential tamper conditions that may occur.

Figure 3:
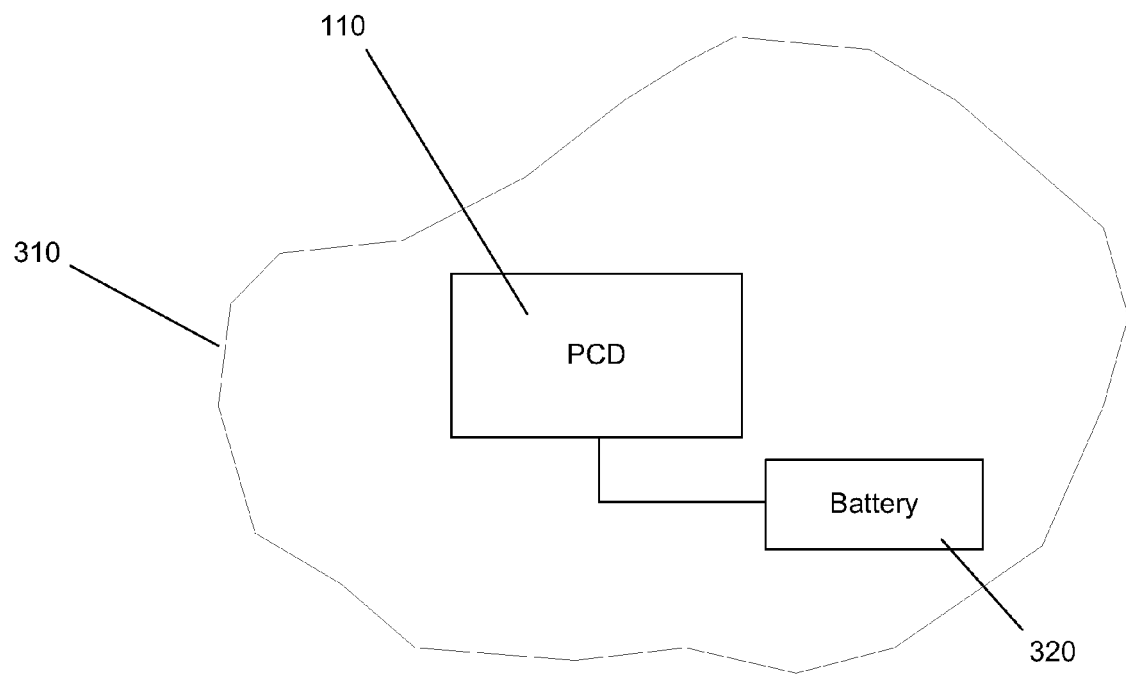
FIG. 3 is a diagram illustrating a PCD device and housing in accordance with an exemplary embodiment of the invention.

Referring now to FIG. 3, there is shown a PCD 110 housed within an external enclosure 310 to appear as part of the environment such as a rock. The PCD is housed within the rock-shaped enclosure as an added security measure to camouflage or hide the device from plain view, a feature beneficial in land-based applications. It is to be understood that the enclosure 310 may be shaped in any manner which would provide an adequate level of camouflage for the PCD. In another aspect of the exemplary embodiment a battery 320 is also housed within the enclosure 310 for providing power to the PCD 110.

Figure 4:
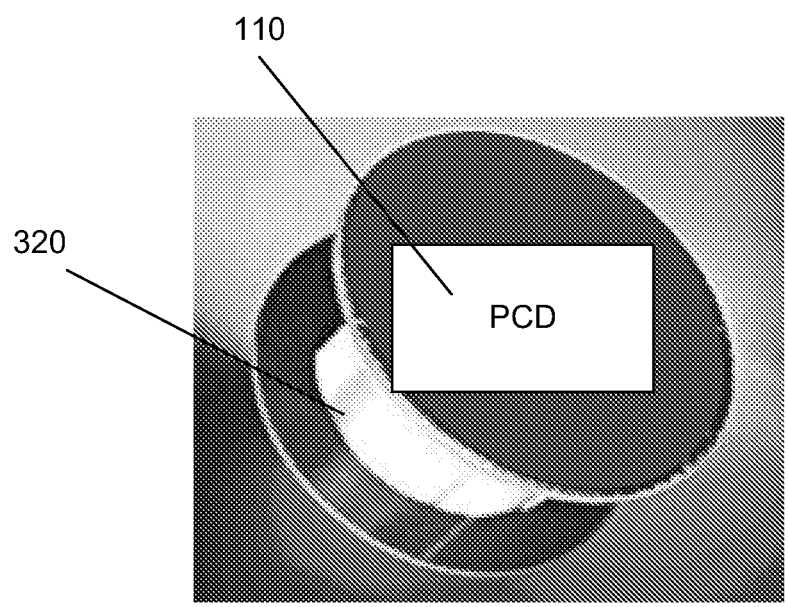
FIG. 4 is a diagram illustrating a PCD device and housing in accordance with another exemplary embodiment of the invention.

Referring now to FIG. 4 a PCD 110 is shown adapted as part of a fiber optic spool 400. The PCD is housed within the spool to improve ease of deployment of the PCD in a sea-based application.

Figure 5:
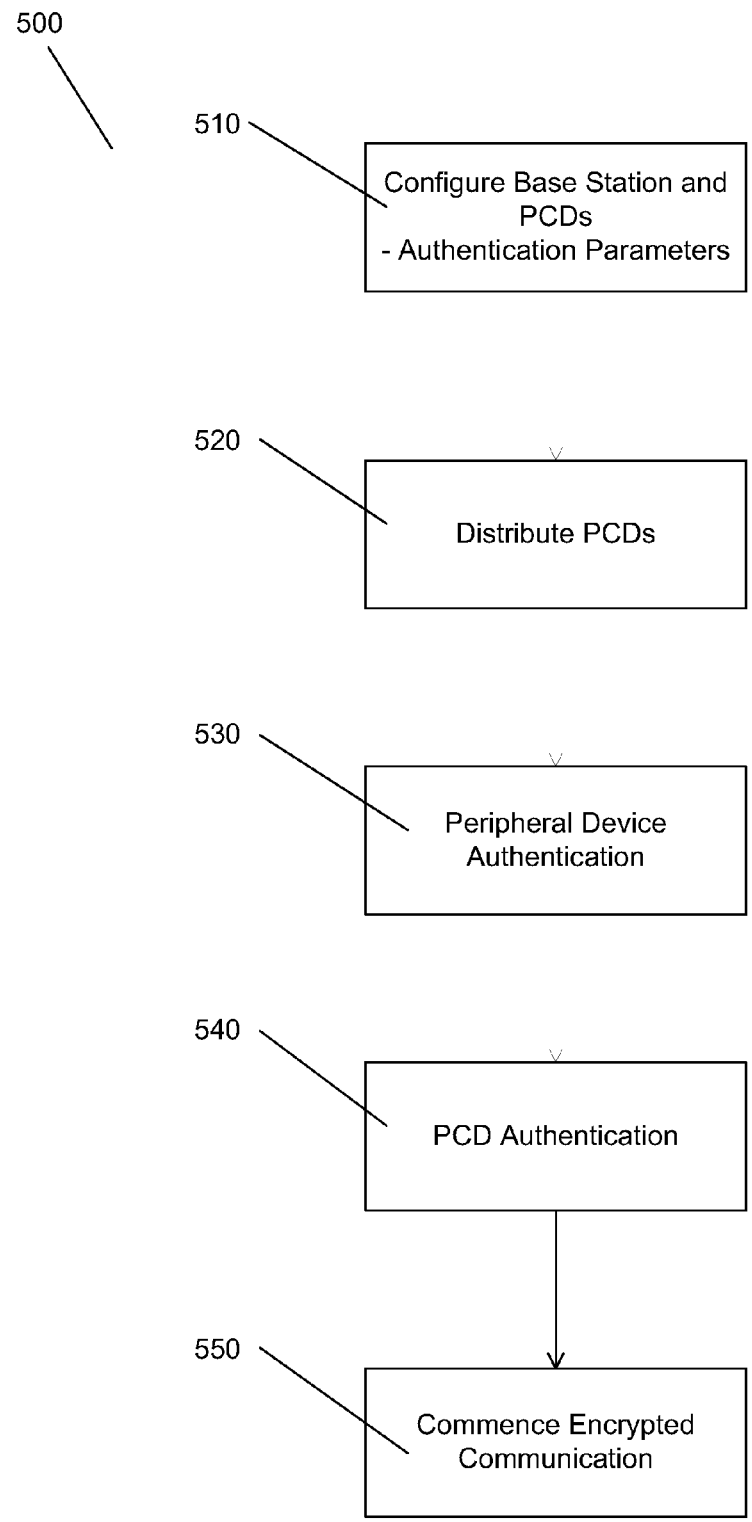
FIG. 5 is a flow chart illustrating operation of an exemplary embodiment of the invention.

Referring now to FIG. 5 a flow chart is shown illustrating operation of an exemplary embodiment of the invention. Operation of the system begins with configuration 510 of the PCDs 110 and/or peripheral devices 130 with the base station 100. During this step authentication parameters such as device serial numbers and passwords or account information are configured. The process continues with distribution 520 of the PCDs 110. In a land-base application distribution can be carried out in any number of ways including projection of the PCD devices to different locations where network access is desired. In an exemplary embodiment, this may be carried out by spooling from a mobile vehicle each PCD from a given location to an intended destination where it will establish itself as a node in the communications network. The devices may also be dispersed by a user as the user moves away from the base station 100. When used in this manner the PCDs allow the user to dynamically extend the range of the network. In a sea-based application, distribution of the PCDs is carried out by tethering a PCD housed in a fiber spool to an existing PCD located on a floating buoy or a fixed position such as the bottom of the ocean. The network range is extended in this case by simply unloading the fiber spool until the line runs out and then connecting another PCD housed within another fiber spool and repeating the process. As each PCD becomes active, the PCD will connect to the network and establish itself as part of a link within the network. Communications parameters and protocols sent to/from the base station and/or to/from other nodes (i.e. other PCDs) within the network shall authenticate and verify maintenance of the node within the network, and/or reconfigure the network according to the communications parameters and node responses.

The network administrator may also be included in the authentication and maintenance of the network, performing such tasks as specifying when the nodes are to be certified and when to allow them to be moved. The process 500 continues with peripheral device authentication 530. Peripheral devices are user-defined and may be implemented as remote sensors, laptop computers or any type of device providing functionality via the network. Once a peripheral device 130 is powered on, the base station 100 authenticates the device through the network, based on parameters such as serial numbers and passwords or account information as was pre-configured with the set of authentication parameters of the base station at block 510. The process continues with PCD authentication 540. Similar to block 530, the base station authenticates the parameters of each PCD through the network to register each as a certified node in the network. In an alternate aspect of the invention PCD authentication may occur prior to peripheral device authentication. Additionally, PCD devices may be responsible for carrying out authentication of the peripheral devices. The network administrator may also participate to increase the security of each node. Successful authentication of the PCD will result in commencement of encrypted communication 550. At this point the system operates as a full network complete with multi-path routing to the extent possible depending on the number of interconnected PCDs and peripheral devices. As allowed by the administrator, the network may be dynamically adjusted via blocks 510, 520, 530, 540 and 550 while continuing to operate.

In an alternate aspect of the invention, establishment of a connection between a peripheral device and a PCD device 110 may be carried out by a connection robot. The connection process begins when an administrator sends a command to a PCD where the connection is to occur. The PCD may then provide a beacon signal such as sound or RF pulses. The connection robot will then start from a predetermined global positioning system (GPS) close location and home in on the beacon signal. The connection robot will mechanically make the physical connection as applicable for the network media. In a fiber wired application the connection robot will mate to the PCD connector. In a wireless application the connection will be established based on proximity of the connection robot to the PCD. The base station then authenticates the new PCD which in a wired application is located on the far-end of the cable just connected, for example in the hub of a fiber spool being rolled out. The connection robot will then return to the submarine, car, or operator depending on the application. The base station then commands the beaconing PCD to disable its beacon signal. A battery replacement step may also occur while the connection robot performs this series of operations.

Figure 6:
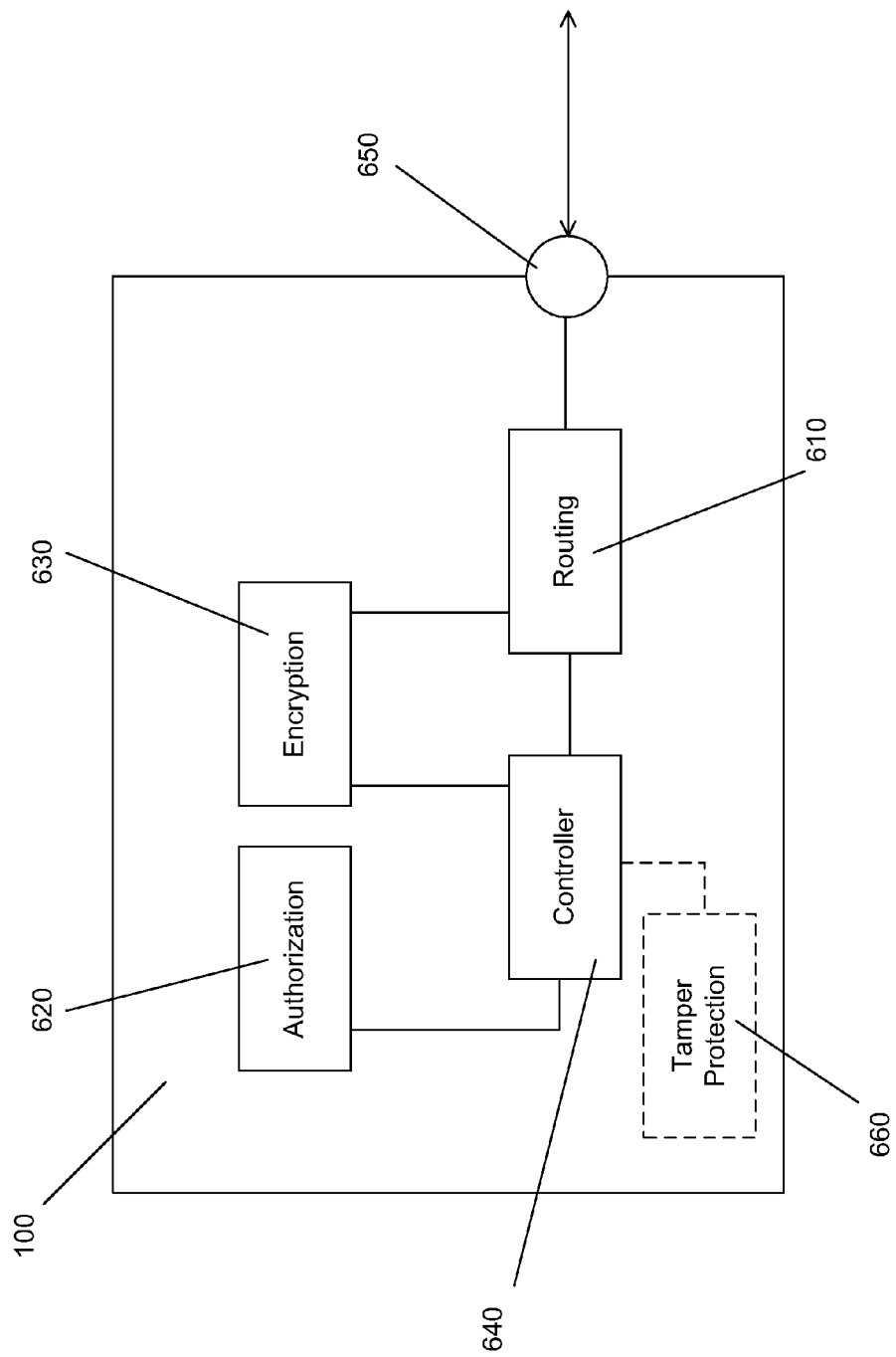
FIG. 6 is a block diagram illustrating a base station in accordance with an exemplary embodiment of the invention.

Referring now to FIG. 6 a block diagram illustrating a base station 100 in accordance with an exemplary embodiment of the invention is shown. The base station 100 is configured with similar functional components as those of the PCD device. The base station 100 includes a routing module 610 for managing routing of data between the base station and externally connected devices and for providing multipath routing management to the full network of PCDs 110*a-d*. The base station 100 also includes an authorization module 620. Authorization module 620 provides logic related to network authorization and authentication. This module includes logic which allows the base station 100 to identity any external device attempting to connect to the base station. In an exemplary aspect of the present embodiment, authentication parameters for each PCD and peripheral device, such as but not limited to a serial number, are configured with the base station 100 prior to deployment. The base station 100 also incorporates encryption logic 630 for encrypting and decrypting data flowing between the base station 100 and any external device. Base station 100 further includes a controller 640 for managing operation of the device. Controller 640 may be implemented as a field-programmable gate array (FPGA), an application-specific integrated circuit (ASIC), a microcontroller or a combination of a microprocessor or CPU and volatile or non-volatile memory. Base station 100 further includes an interface 650 for interfacing with one or more of the interconnecting media of the data link labeled generally as 120. In an alternate aspect of the exemplary embodiment, the base station 100 additionally includes a tamper protection module 660 that provides logic for detecting and appropriately responding to any of a number of potential tamper conditions that may occur at one of the PCD devices to which it is connected.

Figure 7:
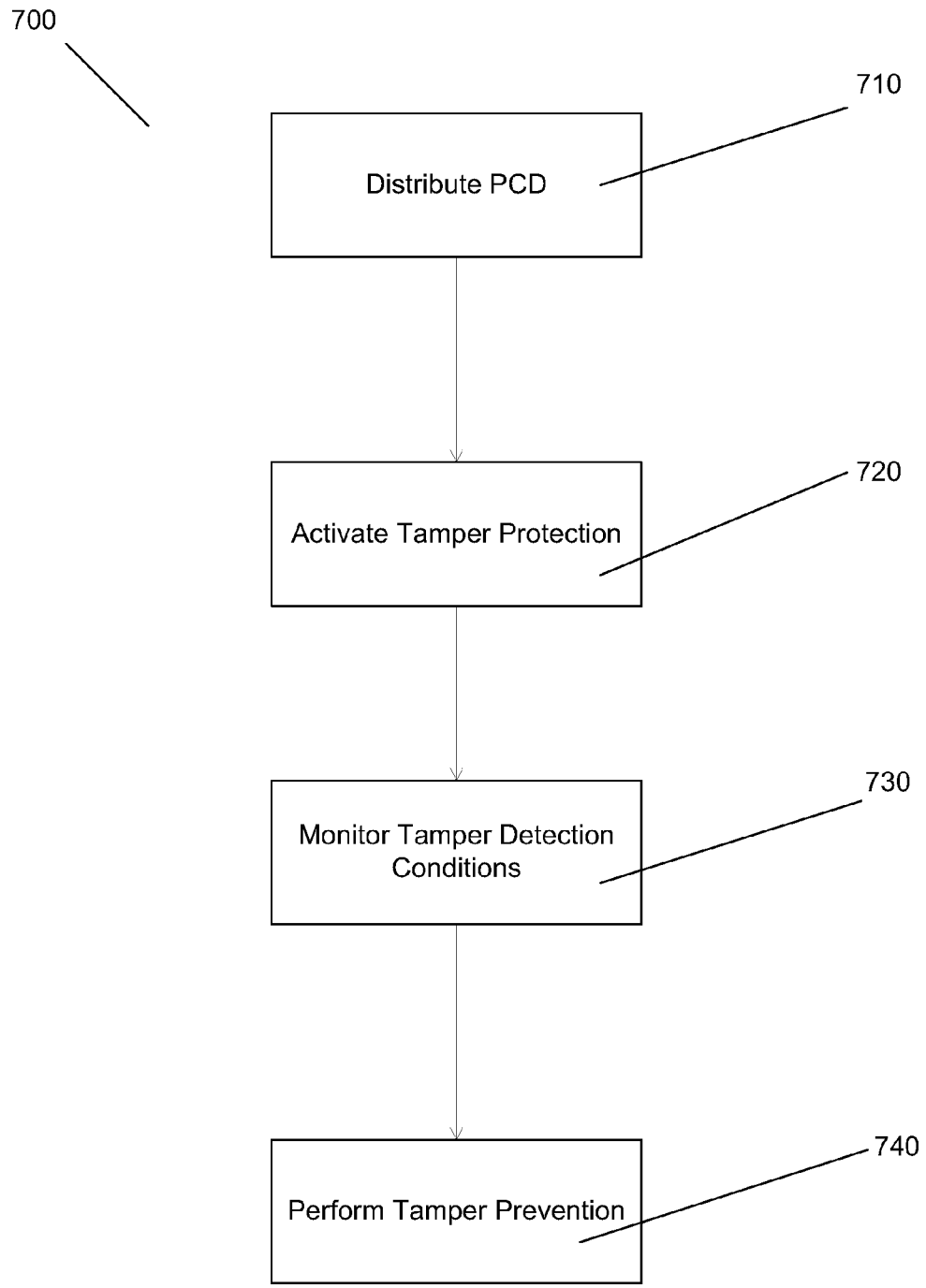
FIG. 7 is a flow chart illustrating an anti-tamper process in accordance with an exemplary embodiment of the invention.

Referring now to FIG. 7, a flow chart is shown illustrating a tamper protection process 700 of an exemplary embodiment of the invention. Upon distribution 710 of each PCD device, tamper protection is activated 720. Following activation the process proceeds by monitoring 730 for a variety of possible tamper-detection conditions. Various sensors may be employed by the tamper protection module including but not limited to motion detectors, video detectors, microphones, and gyroscopes. In a land-based application the indication that a tamper detection condition has occurred may be performed by tracking the location, attitude or movement of the PCD. In a sea-based setting the tamper detection may be additionally based on the depth of the PCD device. Additional tamper conditions may include an unauthorized attempt to electronically access the device, which may be detected during the peripheral authentication 530 or PCD authentication 540 processes referenced in FIG. 5. Tamper conditions may also include unauthorized attempts to physically access the device. Physical attempts to access the PCD may be detected by monitoring the expected location, attitude or movement of the PCD. Following detection of a tamper condition the tamper protection module 280 of the PCD 110 and/or the tamper protection module 660 of the base station 100 will carry out tamper prevention processing 730. This response may include a notification to the base station 100 and other PCD devices that the tamper condition has occurred. The notification may include data corresponding to the nature of the tamper detection such as an image taken in response to a trigger by a motion detector. Other steps may include a powering down or functional disablement of the device. In extreme circumstances the tamper protection module may trigger a physical disablement of the device such as a self-destruct mechanism carried out by initiating an explosive, chemical reaction or internal power surge.

While the foregoing invention has been described with reference to the above-described embodiment, various modifications and changes can be made without departing from the spirit of the invention. Accordingly, all such modifications and changes are considered to be within the scope of the appended claims.

What is claimed is:

1. A system for establishing a self-realizing expandable communications network comprising:
 a portable network communications device (PCD), the PCD comprising:

a) a router module for routing data communications,
b) an authentication module for authenticating data communications received at the PCD,
c) an encryption module for encrypting data communications output from the PCD or decrypting data communication input to the PCD;
d) a controller for controllably switching data communications paths or destinations of the data communications according to a control signal;
wherein the PCD is operable for connecting to a computer device and transferring communications data to/from a remote base station from/to the computer device for establishing remote communications with the base station;
and wherein said PCD is deployed from said base station by projecting said PCD from a location of said base station, thereby establishing a communications network enabling one or more peripheral devices to migrate to a position remote from said base station while maintaining connection with said base station via said PCD.

2. The system of claim 1, wherein the PCD includes a fiber spool coupled thereto for connecting the PCD with the base station.

3. The system of claim 2, wherein said fiber spool comprises a fiber communication line coated in metal and adapted to carry power from a remote power source and wherein said PCD is adapted to receive power over said fiber communication line.

4. The system of claim 1, wherein the PCD includes a wireless transceiver for providing wireless networking capabilities with said base station.

5. The system of claim 1, wherein the PCD includes a wireless transceiver for providing wireless networking capabilities with said one or more peripheral devices.

6. The system of claim 1, wherein the PCD includes a battery for providing power to the PCD.

7. The system of claim 1, wherein the PCD includes a tamper protection module for preventing unauthorized physical access to the PCD.

8. The system of claim 7, wherein the tamper protection module further comprises:
one or more tamper detection mechanisms, the detection mechanisms selected from one of a motion detector, a video detector, a microphone, and an access monitor for detecting unauthorized electronic access;
one or more tamper protection mechanisms, the tamper protection mechanisms selected from one of a notification to the base station and connected PCDs, a functional disablement and a physical disablement; and
wherein the tamper protection module initiates one of said tamper protection mechanisms when a predetermined tamper condition has been determined from one of said tamper detection mechanisms.

9. The system of claim 8, wherein the physical disablement is selected from one of an internal power surge circuit, an explosive and a chemical acid.

10. The system of claim 1 further comprising:
one or more external enclosures, wherein each of said one or more PCDs is housed within said one or more external enclosures.

11. The system of claim 10, wherein said enclosure is shaped to be camouflaged from plain view.

12. The system of claim 10, wherein said enclosure is a fiber-optic spool.

13. A method for establishing a self-realizing expandable communications network comprising:
providing one or more portable communication devices (PCDs) and a base station, each of said PCDs comprising
a) a router module for routing data communications,
b) an authentication module for authenticating data communications received at each of the said PCDs,
c) an encryption module for encrypting data communications output from the said PCDs or decrypting data communication input to the PCDs; and
d) a controller for controllably switching data communications paths or destinations of the data communications according to a control signal;
configuring said one or more PCDs and said base station using a first set of authentication parameters to allow remote authentication of said one or more PCDs by said base station;
deploying said one or more PCDs from said base station to multiple locations by projecting said one or more PCDs from a location of said base station;
activating said one or more PCDs;
authenticating said one or more PCDs from said base station using said first set of authentication parameters, thereby establishing a communications network enabling one or more peripheral devices to migrate to a position remote from said base station while maintaining connection with said base station via said one or more PCDs.

14. The method of claim 13 further comprising the steps of:
providing the one or more peripheral devices;
configuring said one or more PCDs with a second set of authentication parameters;
establishing a connection between said one or more peripheral devices and said one or more PCDs;
authenticating said one or more peripheral devices from said one or more PCDs using said second set of authentication parameters.

15. The method of claim 14, wherein said second set of authentication parameters comprises one or more predetermined passwords.

16. The method of claim 13 further comprising the steps of:
providing one or more tamper detection mechanisms and one or more tamper prevention mechanisms;
monitoring said one or more tamper detection mechanisms for a predetermined tamper condition;
responding to said predetermined tamper condition by initiation of one or more of said tamper prevention mechanisms.

17. The method of claim 16, wherein said one or more tamper detection mechanisms are selected from one of a motion detector, a video detector, a microphone, and an access monitor for detecting unauthorized electronic access.

18. The method of claim 16, wherein said one or more tamper protection mechanisms is selected from one of a notification to the base station and connected PCDs, a functional disablement and a physical disablement.

19. The method of claim 18, wherein the physical disablement is selected from one of an internal power surge circuit, an explosive and a chemical acid.

20. The method of claim 13, wherein said first set of authentication parameters comprises PCD serial numbers.

21. The method of claim 13, wherein said dispersing of said PCDs further comprises projecting said PCDs from a location of said base station or of a current user location.

* * * * *